Sept. 15, 1970   M. J. CARLSON   3,528,596
APPARATUS FOR PULSE FORMING
Original Filed Sept. 30, 1966

INVENTOR.
Melvin J. Carlson
BY Bernard J. Ohlendorf
ATTORNEY 3,528,596
APPARATUS FOR PULSE FORMING
Melvin J. Carlson, Havre de Grace, Md., assignor to the United States of America as represented by the Secretary of the Army
Original application Sept. 30, 1966, Ser. No. 584,064, now Patent No. 3,417,456, dated Dec. 24, 1968. Divided and this application July 24, 1968, Ser. No. 760,377
Int. Cl. B23k 21/00
U.S. Cl. 228—3                    1 Claim

ABSTRACT OF THE DISCLOSURE

Apparatus for sudden impulse joining of a tubular workpiece to a cylindrical workpiece comprising three integral rings, a circular field shaper having an axial hole, and a pair of rings of rectangular cross section formed in the axial hole.

---

The invention described herein may be manufactured, used, and licensed by or for the Government for governmental purposes without the payment to me of any royalty thereon.

This application is a divisional application of my pending U.S. patent application Ser. No. 584,064 filed Sept. 30, 1966 now Pat. No. 3,417,456.

This invention relates to the apparatus whereby a circular piece is diffusion bonded to a cylindrical piece to provide a leak-proof joint.

The main object of my invention is to provide apparatus whereby metal pieces are permanently joined together without welding or brazing.

A further object of this invention is to provide apparatus to permanently bond metal components to eliminate the need for extensive prior cleaning of the components.

A still further object of this invention is to join metal components to provide a leak-proof seal in a very short time, such as five seconds per part.

A final object of this invention is to provide apparatus which will seal a chemical container in a manner such that none of the chemical agent or material is degraded during the sealing operation.

The problem of sealing chemical agent munitions has existed for many years. The old methods for performing the function of my invention were by welding or brazing the workpiece. The surfaces of the workpieces had to be specially prepared and cleaned. In the case of filling a munition containing receptacle, the workpiece, after being welded, had to be cleaned and tested for leaks, followed by annealing to relieve the localized stress of the intense heat of the weld. Furthermore, the filler plug hole had to be drilled and reamed, then the container filled with a chemical agent, and finally a filler plug presses into place and again leak tested.

It is also known to form or swage metallic parts by means of high energy, high speed forming operations such as explosive forming, electrohydraulic forming, pneumatic-mechanical forming and magnetic forming.

The advantages of my apparatus over the welding operation are that the apparatus can be used by unskilled labor (i.e. one does not have to be a skilled welder). The joining operation can be performed in approximately 1–5 seconds, whereas the welding operation took 3–5 minutes. The intense heat of the welding operation is eliminated (i.e. this invention does not generate any heat).

The advantages of my apparatus over the prior high energy, high speed forming operations are that those prior operations did not produce a leak proof seal or rather, the seal failed to pass the rigorous helium leak test set forth below.

A further advantage is that close tolerances can be maintained since there is no distortion due to any intense heat.

Other advantages of my invention include the fact that non-compatible metals and plastics can be joined with a strong leakproof seal. Only one joint, that is to say the final sealing joint, has to be inspected or leak tested. Thus, it can be seen that my invention is ideally suited for mass production of items that have to be joined in a permanent bond.

It is the standard practice of the U.S. Army when filling chemical munitions to exhaust the air and add in the void space over the chemical agent a helium atmosphere. This helium atmosphere will leak through minute cracks and faults in the walls of the container, or the sealing of the joint. This is because helium is a monoatomic gas and will pass through small holes which would not allow a larger molecule such as the chemical agent to pass through. This has the advantage that in storage a helium leak detector will indicate that some of the chemical munitions are defective and must be replaced if there is a positive indication of helium in the atmosphere. It has been ascertained that when using my apparatus that the joint or bond obtained will pass the U.S. Army standard test of having no leakage rate greater than $1 \times 10^{-6}$ cc./second with a helium pressure of 15 p.s.i.g. in the munition.

Other objects and advantages of this invention will become apparent as the following description is read in connection with the accompanying drawing, in which.

Figure 1:
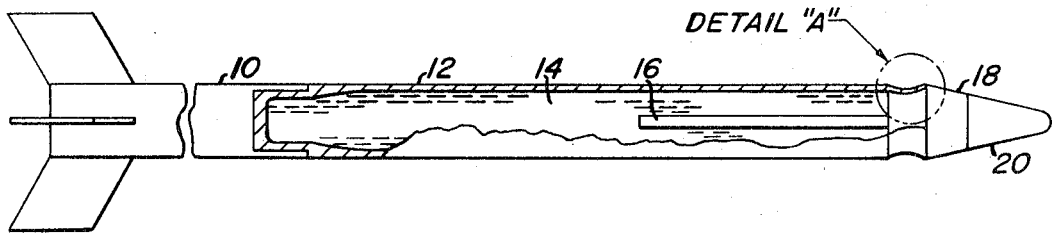
FIG. 1 is a partial cross section of a typical munition using my bonding apparatus.
Figure 2:
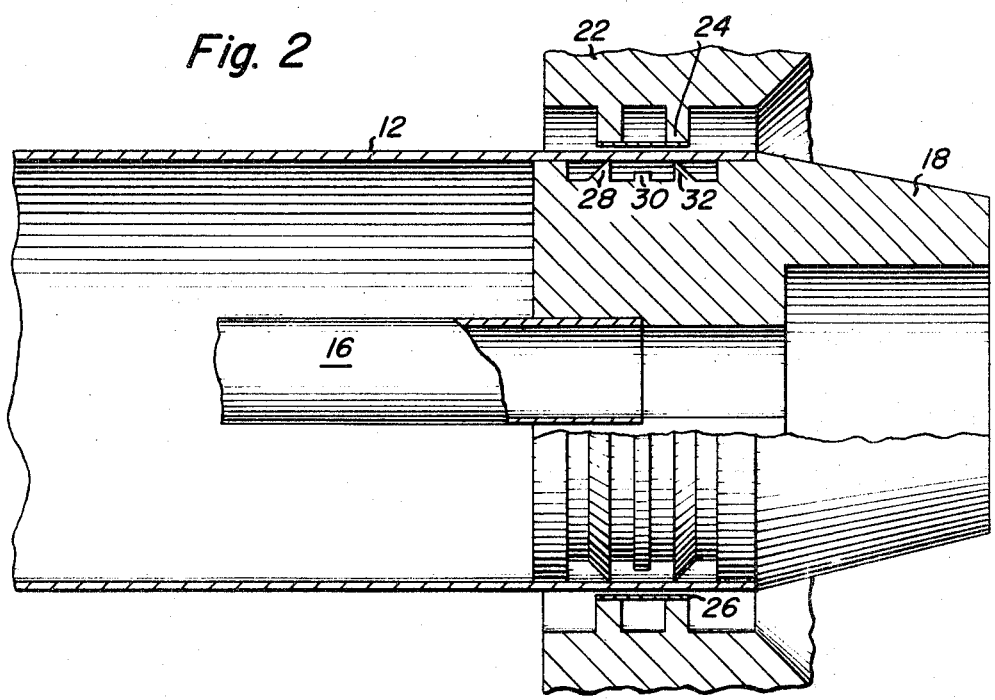
FIG. 2 shows a typical arrangement of the rocket warhead before the sealing operation.
Figure 3:
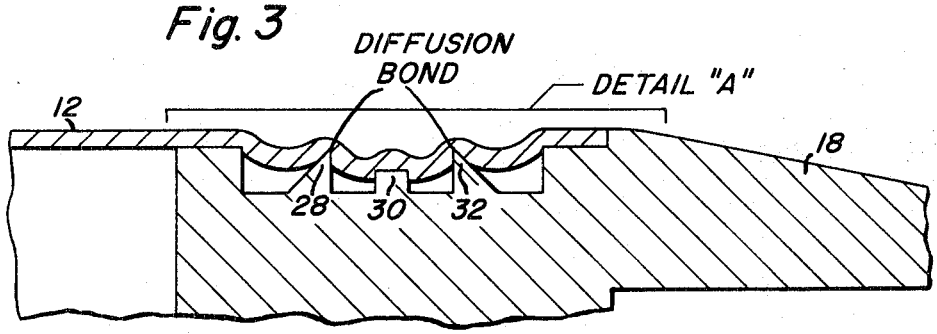
FIG. 3 shows a detail of the bond after the sealing operation.

Referring now to the drawing, 10 designates the rocket body provided with a payload containing compartment 12 in which is sealed the chemical payload 14. This can be any liquid or solid military chemical agent such as white phosphorus, or the G-agents (see U.S. Pat. No. 2,867,509). The central burster which is shown at 16 will explode the rocket when the impact fuse 20 strikes the target area. An insert or plug 18 is provided by which the container 12 is sealed during the course of the bonding process.

As a result of my studies of the high energy rate forming process described above, I have discovered that a specific combination or design of rings and grooves are necessary to successfully seal a cylindrical container using this high energy rate forming process. Thus, I have discovered that it is necessary to provide the plug 18 with three integral rings spaced a predetermined distance apart with the center ring 30 of a rectangular cross section and a pair of rings of right-triangular cross section 28 and 32, spaced on either side of the center ring 30. It is to be noted that the hypotenuse of each of the triangular cross sections slopes towards the center ring 30. The spacing between the rings of triangular cross sections 28 and 32 is approximately equal to the spacing between the rectangular cross sectional rings 24 of the circular field shaper 22. An insulator 26 is provided to insulate the metallic components if needed.

In general, I have discovered that the distance from the peak of the triangular ring 28 or 32 to the bottom of the groove should be approximately 1–3 times the thickness of the cylindrical container 12. Likewise, the distance from the peak of the triangular groove 28 or 32 to the top of the rectangular central ring 30 should be approximately one-half the thickness of the cylindrical container or workpiece 12. The distance between the peaks of the triangular rings 28 and 32 should be approximately 5–10 times the thickness of the cylindrical container 12. Obviously, the distance between rings 24 should be the same as the distance between rings 28 and 32. The shape of the triangular rings 28 and 32 must have a general shape shown on the drawings (i.e. an approximately 45° angle at the peak). Substantially the same results will be obtained with an angle of 40–50°; however, I prefer the 45° angle as it gives the best results. These results are that a leak tight diffusion bond between the plug 18 and the container 12 results where the triangular ring is impacted into the cylindrical container. In the center of the bonding zone, the rectangular central ring 30 achieves a form seal in the cylindrical workpiece 12, which gives added strength to the bond.

In general, utilization of my invention consists of first fabricating the plug 18 so as to provide three integral rings as set forth above. This can be done by any conventional machining technique such as using milling cutters of the desired configurations or by turning on an engine lathe. The parts to be assembled are merely wiped clean. The next step is to assemble the components in the high energy rate forming machine or device which has the two spaced rings 24 of a rectangular cross section. The final step is to subject my specific configuration to a high energy rate forming process such as an explosive impulse, a high speed ram, and a super magnet such as the Magneform machine. These high energy rate forming processes exceeding 50,000 lbs. per square inch (generally in the range of 50,000–750,000 p.s.i.) in micro seconds and are responsible for the desired diffusion bonding of my particular design. The resulting bond is as good as or better than the welding operation with the advantage that no heat is produced and the bonding operation is accomplished in a much shorter time. For convenience and speed of operation, we have found the Magneform machine to be superior to the other apparatus which, however, produce a bond which is equally desirable.

Obviously, my invention can be applied to the sealing of any container where it is desired to permanently seal a chemical or biological material. Hence, my invention has both military and commercial applications.

I have disclosed my invention with a limited number of embodiments. Obviously, it is possible for a person skilled in the art to produce other variations without departing from the inventive concept disclosed herein. Therefore, it is desired that only such limitation be imposed on the appended claim as are stated therein or are required by the prior art.

I claim:

1. Apparatus for sudden impulse joining of a tubular workpiece to a cylindrical workpiece said tubular workpiece having three integral rings spaced a predetermined distance apart with a center ring of a rectangular cross section and a pair of rings of right triangular cross sections spaced on either side of said center ring in a manner such that the hypotenuse of each of said triangular cross sections slopes towards said center section comprising:

(a) a circular field shaper having an axial hole of a diameter sufficient to encompass said tubular workpiece,
 (1) a pair of rings of rectangular cross section formed in said axial hole a distance apart equal to the spacing of said triangularly shaped rings and extending radially a distance such that the internal ring diameter is substantially equal to the external diameter of said tubular workpiece.

References Cited

UNITED STATES PATENTS

| | | | |
|---|---|---|---|
| 1,163,784 | 12/1915 | Skinner | 29—521 |
| 1,179,853 | 4/1916 | McCulloch | 29—516 |
| 2,289,271 | 7/1942 | Kane et al. | 29—470.5 |
| 3,106,014 | 10/1963 | Brick et al. | 29—475 |
| 3,364,562 | 1/1968 | Armstrong | 29—482 |
| 3,417,456 | 12/1968 | Carlson | 228—3 X |

JOHN E. CAMPBELL, Primary Examiner

R. J. CRAIG, Assistant Examiner

U.S. Cl. X.R.

29—470.1; 72—56; 264—84